M. E. LESEM.
TIRE STRUCTURE.
APPLICATION FILED APR. 10, 1915.
1,174,170.   Patented Mar. 7, 1916.
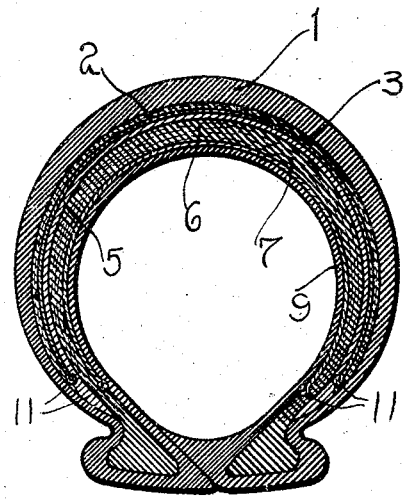
Fig.1
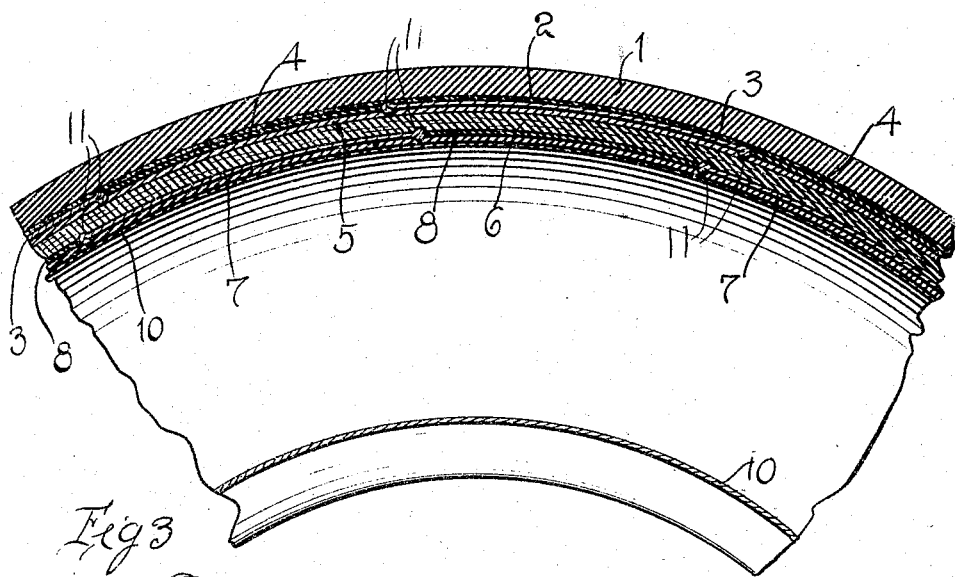
Fig.2
Fig.3
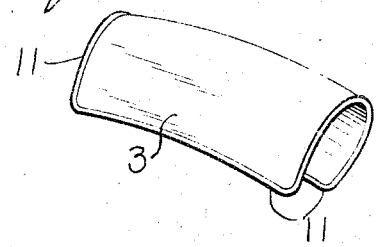
Inventor
M. E. Lesem
By Watson E. Coleman
Attorney

UNITED STATES PATENT OFFICE.

MILTON E. LESEM, OF CAPE GIRARDEAU, MISSOURI.

TIRE STRUCTURE.

1,174,170. Specification of Letters Patent. Patented Mar. 7, 1916.

Application filed April 10, 1915. Serial No. 20,503.

*To all whom it may concern:*

Be it known that I, MILTON E. LESEM, a citizen of the United States, residing at Cape Girardeau, in the county of Cape Girardeau and State of Missouri, have invented certain new and useful Improvements in Tire Structures, of which the following is a specification, reference being had to the accompanying drawings.

This invention relates to certain improvements in tire structures, and it is an object of the invention to provide a structure of this general character having novel and improved means whereby the possibility of the same becoming punctured is substantially entirely eliminated.

The invention consists in the details of construction and in the combination and arrangement of the several parts of my improved tire structure whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a transverse sectional view taken through a tire structure constructed in accordance with an embodiment of my invention; Fig. 2 is a fragmentary longitudinal sectional view taken through my tire as herein set forth; and Fig. 3 is a view in perspective, detached, of one of the metallic plates herein disclosed.

As disclosed in the accompanying drawings, my improved tire includes a shoe comprising a series of superimposed laminations, the outer or tread layer 1 being formed of rubber so that the same will have the requisite gripping action on the surface over which the tire may travel and serves as an effective means to prevent the slipping of the same. The layer 1 is provided with a lining 2 of rubber and fabric and bearing against such lining in predetermined spaced relation are the elongated metallic strips 3 possessing requisite pliability and said plates are maintained against movement one relative to the other through the medium of the interposed strips 4 of pure rubber. The members 3 and strips 4 are provided with a lining 5 also of pure rubber and coacting therewith is the layer 6 of reinforced rubber and of a thickness materially in excess of the thickness of the lining 5. Coacting with the inner surface of the layer 6 are the elongated metallic members 7 suitably spaced and alternating with the strips 3, hereinbefore referred to, and it is to be observed that the adjacent extremities of the strips 3 and 7 overlap a sufficient distance to prevent the passage of a pointed object through the structure at any angle. It is to be observed that the plates 3 and 7 are bent transversely to conform to the configuration in cross section of the tire structure and the plates 3 and 7 are so spaced that the intermediate major portions of said plates 3 are free of the intermediate major portions of said plates 7 and that only the extreme end portions of said plates 3 and 7 are in overlapping relation. Interposed between the member 7 are the strips 8 of pure rubber which serve to maintain said strips 7 against movement one relative to the other and assure their maintenance in the requisite positions. It is also to be noted that the plates 3 and 7 are of a width to bridge the tread portion of the tire structure and to extend beyond and inwardly of the centers of the side faces of the tire structure. The strips 8 and members 7 are provided with the lining 9 of pure rubber. It is to be particularly noted that the plates or strips 3 and 7 are of such a width as to bridge the tread portion of the tire structure and to extend below the side faces of the tire structure. This in practice has served to effectively protect the device against injury.

It will be readily understood that after the foregoing parts have been assembled, the structure will be vulcanized in the usual way and is adapted to have employed in connection therewith a conventional inner tube 10.

From the foregoing description, it is thought to be obvious that a tire structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the scope of the appended claim and for this reason I do not wish to be understood as limiting myself to the precise arrangement and formation of the several parts herein shown in carrying out my invention in practice.

It is to be particularly observed that the marginal portions of the strips or members 3 and 7 are beaded, as indicated at 11, whereby the possibility of such members or strips cutting or otherwise injuring the adjacent laminations is eliminated.

I claim:

A tire structure including a shoe comprising a series of superimposed laminations, the outer layer being formed of rubber, a lining of reinforced rubber for said outer layer, a circular series of elongated metallic plates positioned adjacent said lining and spaced one from the other a predetermined distance, interposed strips of rubber positioned between the adjacent ends of the metallic plates, a lining of rubber for said plates and strips, a layer of reinforced rubber underlying the last named lining and of a thickness materially in excess of said last named lining, a second circular series of metallic plates concentric to the first circular series of plates and underlying said last named layer and spaced a predetermined distance one from the other, said last named plates being alternately disposed relative to the first named plates, the extreme end portions of the alternately related plates being in overlapping relation, the intermediate major portions of the plates of one series being free of the intermediate major portion of the plates of the second series, the plates of each circular series being curved transversely and of a width to bridge the tread portion of the tire structure and to extend inwardly of the centers of the side faces of the tire structure.

In testimony whereof I hereunto affix my signature.

MILTON E. LESEM.